(No Model.)
R. DODSON.
NUT LOCK.
No. 580,382.
Patented Apr. 13, 1897.
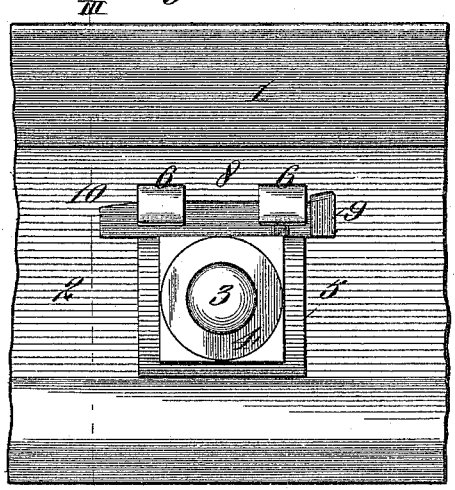
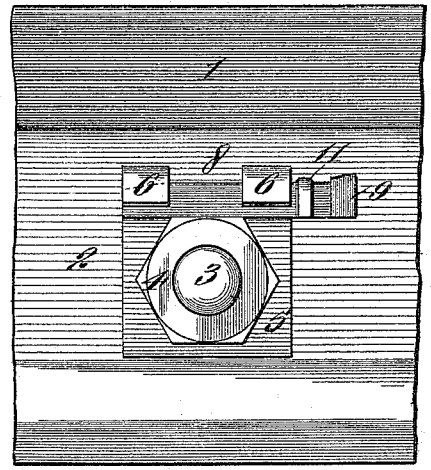
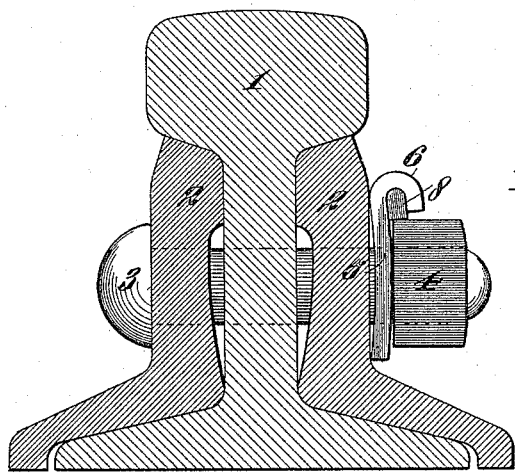
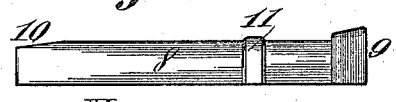
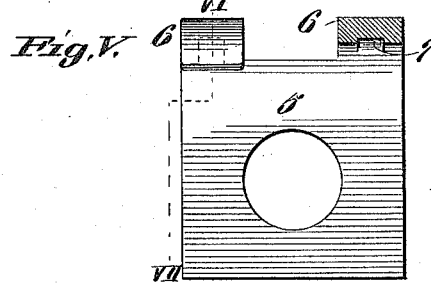
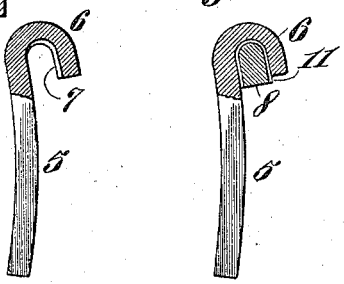
Attest:
E. S. Knight
N. Finley.
Inventor:
Roy Dodson.
By Knight Bro
atty's

UNITED STATES PATENT OFFICE.

ROY DODSON, OF DALLAS, TEXAS.

NUT-LOCK.

SPECIFICATION forming part of Letters Patent No. 580,382, dated April 13, 1897.

Application filed June 10, 1896. Serial No. 594,915. (No model.)

*To all whom it may concern:*

Be it known that I, ROY DODSON, of Dallas, Dallas county, State of Texas, have invented a certain new and useful Improvement in Nut-Locks, of which the following is a full, clear, and exact description, reference being had to the accompanying drawings, forming a part of this specification.

My invention relates to an improvement in nut-locks especially adapted for use in securing nuts upon bolts at the joints of railway-rails; and, briefly described, the invention consists in a washer provided with a pair of lips containing grooves upon their interior, into which lips a locking-key is inserted in such manner that it bears upon the edge of the nut, said key being provided with a rib or projection that engages the groove in one of the lips, and is thereby retained in position.

Referring to the drawings, Figure I shows the nut-lock in front elevation, the key being driven into locked position. Fig. II shows a similar view to Fig. I, except that the locking-key is shown only partly entered into the lips. Fig. III illustrates a vertical section taken on line III III, Fig. I. Fig. IV is a side view of the locking-key. Fig. V is a front view of the washer, one of the lips of which is shown in section. Fig. VI is a view in part of the edge of the washer and in part a section taken on line VI VII, Fig. V. Fig. VII is a similar view to Fig. VI, showing the locking-key in the position it assumes in the lips of the washer.

In the drawings, 1 designates a railway-rail; 2, fish-bars; 3, a bolt, and 4 a nut.

5 designates a washer, which is preferably concavo-convex in form in order to provide a degree of elasticity in it, so that the nut may be forced up square to allow ready and proper insertion of the locking-key, also to take up any looseness that would otherwise be present between the head of the bolt and the nut. The washer is provided with a pair of lips 6, that are turned forward and downward. Within each lip, extending from the rear to the forward end of the lip, is a groove 7.

8 designates the locking-key, provided with a head 9 and tapering point 10. Formed upon the key, preferably near its head, is a rib or projection 11. This rib or projection preferably extends across the two sides and across one edge of the locking-key, though it may be formed only upon one side or upon the upper edge of the key.

In applying the nut-lock the washer is first placed upon the bolt and the nut then screwed tightly against the washer. The locking-key is then driven into the lip 6, its tapering point 10 allowing for its being easily started, and the key is driven inward until the rib or projection 11 enters the groove 7 of one of the lips 6. With the rib or projection 11 as shown in the drawings said rib or projection would engage with the groove of the lip into which the locking-key first enters, but it is evident that the rib or projection might be located upon the opposite end of the locking-key, and it could then be driven past the first lip and engage in the groove of the second.

My nut-lock is capable of use with a nut of any form, and for the purpose of illustrating such capability I have shown in Figs. I and III the employment of a four-sided nut and in Fig. II the employment of a hexagonal nut.

I am aware that it is not broadly novel to construct a nut-lock having a washer provided with lips or flanges, between which lips or flanges and the nut a key is driven, and I therefore do not claim such, broadly considered, as my invention.

I claim as my invention—

In a nut-lock, the combination of a washer, lips formed upon said washer, said lips being so arranged upon the washer as to be outside of the periphery of the nut to be locked, a groove 7 in one of said lips, and a locking-key provided with a transversely-arranged rib adapted to engage in said groove, substantially as and for the purpose set forth.

ROY DODSON.

In presence of—
E. S. KNIGHT,
N. FINLEY.